United States Patent
Chang et al.

(10) Patent No.: US 10,093,851 B2
(45) Date of Patent: Oct. 9, 2018

(54) ENCAPSULATION OF AN ACID PRECURSOR FOR OIL FIELD APPLICATIONS

(71) Applicant: Saudi Arabian Oil Company, Dhahran (SA)

(72) Inventors: Yun Chang, Dhahran (SA); Mazen Kanj, Dhahran (SA); Curt Thies, Henderson, NV (US)

(73) Assignee: SAUDI ARABIAN OIL COMPANY (SA)

( * ) Notice: Subject to any disclaimer, the term of this patent is extended or adjusted under 35 U.S.C. 154(b) by 3 days.

(21) Appl. No.: 15/398,156

(22) Filed: Jan. 4, 2017

(65) Prior Publication Data
US 2017/0114268 A1   Apr. 27, 2017

Related U.S. Application Data (62) Division of application No. 14/748,783, filed on Jun. 24, 2015, now Pat. No. 9,796,919.

(60) Provisional application No. 62/016,307, filed on Jun. 24, 2014.

(51) Int. Cl.
| | |
|---|---|
| C09K 8/92 | (2006.01) |
| E21B 37/00 | (2006.01) |
| E21B 43/16 | (2006.01) |
| C09K 8/52 | (2006.01) |
| C09K 8/72 | (2006.01) |
| C09K 8/74 | (2006.01) |
| E21B 43/25 | (2006.01) |
| E21B 21/00 | (2006.01) |

(52) U.S. Cl.
CPC .......... *C09K 8/92* (2013.01); *C09K 8/52* (2013.01); *C09K 8/72* (2013.01); *C09K 8/74* (2013.01); *E21B 37/00* (2013.01); *E21B 43/16* (2013.01); *E21B 43/25* (2013.01); *E21B 21/003* (2013.01)

(58) Field of Classification Search
CPC .... C09K 8/52; C09K 8/92; C09K 8/72; E21B 37/00; E21B 43/25; E21B 21/003
See application file for complete search history.

(56) References Cited

U.S. PATENT DOCUMENTS

| | | |
|---|---|---|
| 3,966,962 A | 6/1976 | Yalkowsky |
| 5,741,591 A | 4/1998 | Tashiro et al. |
| 5,936,217 A | 8/1999 | Takahashi et al. |
| 6,207,620 B1 | 3/2001 | Gonzalez et al. |
| 6,444,316 B1 | 9/2002 | Reddy et al. |
| 6,527,051 B1 | 3/2003 | Reddy et al. |
| 6,554,071 B1 | 4/2003 | Reddy et al. |
| 7,196,040 B2 | 3/2007 | Heath et al. |
| 7,431,089 B1 | 10/2008 | Couillet et al. |
| 7,540,328 B2 | 6/2009 | Brown et al. |
| 2004/0031408 A1 | 2/2004 | Makino |
| 2006/0054325 A1 | 3/2006 | Brown et al. |
| 2007/0169938 A1 | 7/2007 | Moorehead et al. |
| 2008/0289828 A1* | 11/2008 | Hutchins et al. ........ C09K 8/68 166/308.3 |
| 2008/0314594 A1 | 12/2008 | Still et al. |
| 2012/0037368 A1 | 2/2012 | Eick et al. |
| 2013/0081826 A1 | 4/2013 | Al-Khaldi et al. |
| 2013/0192839 A1 | 8/2013 | Brown et al. |
| 2014/0069644 A1 | 3/2014 | Reddy et al. |
| 2014/0131046 A1 | 5/2014 | Al-Otaibi et al. |

FOREIGN PATENT DOCUMENTS

| | | |
|---|---|---|
| EP | 0919695 A2 | 6/1999 |
| EP | 1049535 B1 | 8/2002 |
| WO | 2005046651 A1 | 5/2005 |
| WO | 2007083128 A1 | 7/2007 |

OTHER PUBLICATIONS

International Search Report and Written Opinion for related PCT application PCT/US2012/037356 dated Sep. 21, 2015.

* cited by examiner

*Primary Examiner* — Nathan M Nutter
(74) *Attorney, Agent, or Firm* — Bracewell LLP; Constance Gall Rhebergen (57) ABSTRACT

The present application provides for an acid precursor capsule that includes an acid precursor that is a non-aqueous ester and a polymerized shell that encapsulates the acid precursor. In some embodiments, the acid precursor converts into an associated acid during a hydrolysis period while in contact with water at an elevated temperature. In further embodiments, the associated acid is soluble in water and forms an aqueous acid solution with water. In certain embodiments, the polymerized shell contains the acid precursor and prevents interaction between the acid precursor and water at the elevated temperature until the polymerized shell dissolves in the water during a dissolution period. An acid precursor capsule suspension can include the acid precursor capsule and a suspension fluid. In some embodiments, a method of treatment using acid precursor capsules is provided that includes the step of introducing an acid precursor capsule suspension into a well bore such that the acid precursor capsules contact water at an elevated temperature.

13 Claims, 5 Drawing Sheets

ENCAPSULATION OF AN ACID PRECURSOR FOR OIL FIELD APPLICATIONS

RELATED APPLICATIONS

This application is a divisional application of U.S. patent application Ser. No. 14/748,783 filed on Jun. 24, 2015, which claims priority from U.S. Provisional App. No. 62/016,307 filed on Jun. 24, 2014. For purposes of United States patent practice, this application incorporates the contents of both the non-provisional and provisional applications by reference in their entirety.

BACKGROUND OF THE INVENTION

Field of the Invention

The field of invention relates to the production of hydrocarbons. More specifically, the field relates to a composition and method for stimulating the production of hydrocarbons.

Description of the Related Art

The production of hydrocarbons can be stimulated by removing filter cake from the well bore wall of a well bore and the face of the hydrocarbon-bearing formation, and by forming wormholes into the hydrocarbon-bearing formation. Such fluid pathways allow hydrocarbons to traverse the hydrocarbon-bearing formation, and the wormholes can access previously inaccessible, fluidly isolated portions the hydrocarbon-bearing formation. Matrix acids, including hydrofluoric acid and hydrochloric acid, are well known in the art to achieve such goals. The acids react with the portions of the filter cake and the hydrocarbon-bearing formation susceptible to acid attack (for example, silicates and carbonates) upon contact.

One problem with using a strong acid in a hydrocarbon-bearing formation is that the filter cake removal may be non-uniform due to differences in the composition of the filter cake, leaving the face of the hydrocarbon-bearing formation with blockages. This reduces the total volumetric flow of fluid that the hydrocarbon-bearing formation is capable of conveying through the face. The other issue is that strong matrix acids tend to react with the formation in an instantaneous manner upon contact due to the amount of acid-reactive material present. This results in the depletion of the strong acid species almost immediately upon contact with the formation. It may also result in the creation of wide, shallow (that is, not penetrating deep into the formation relative to the distance from the well bore) and non-uniform wormholes through the hydrocarbon-bearing formation. These shallow wormholes are not the desirable deep fluid pathways through the hydrocarbon-bearing formation that act as tributaries for the well bore and enhance the rate and efficiency of hydrocarbon extraction.

Esters of acids have been used to overcome the problems of strong matrix acids reacting too quickly and unevenly with both the filter cake and the hydrocarbon-bearing formation. Esters of acids can hydrolyze in the presence of water into organic acids to form acidic solutions. As an acidic solution forms, the resulting acid is consumed, which drives the reversible hydrolysis reaction to completion. The hydrolysis rate is determined by the type of ester and the temperature of the aqueous solution. It is known that an ester of acetic acid in water at 100° C. may completely hydrolyze into acetic acid within 24 hours.

However, even this amount of time may not be sufficient to deliver the ester of the acid to the treatment site. Well bores in modern practice are extended horizontally for distances up to and beyond 30 kilometers from a single vertical well. In addition, modern well configurations may include 1) multi-lateral wells, which have multiple branches either from a single vertical or a horizontal shaft, or both; and 2) multi-tier wells, where different hydrocarbon-producing formations are tapped using a single production well. Navigating and traversing through complex well bores to a production face may therefore take several days.

It is desirable to develop a method of removing filter cake more uniformly or acidizing a hydrocarbon-bearing formation more deeply, or both, using a system that allows the user adequate time to maneuver the system in place for targeted application and distribution.

SUMMARY OF THE INVENTION

An acid precursor capsule including a non-aqueous ester acid precursor is disclosed that is operable to convert into an associated acid during a hydrolysis period while in contact with water at an elevated temperature. The associated acid is soluble in the water and is operable to form an aqueous acid solution with the water. The acid precursor capsule also includes a polymerized shell. The polymerized shell encapsulates the non-aqueous ester acid precursor such that the polymerized shell contains the non-aqueous ester acid precursor and prevents interaction between the non-aqueous ester acid precursor and the water. The polymerized shell is operable to dissolve during a dissolution period while in contact with the water at the elevated temperature. The acid precursor capsule has a mean diameter and has a mean thickness.

An acid precursor capsule delivery system as disclosed herein may include the acid precursor capsule and a suspension fluid. The suspension fluid is operable to suspend the acid precursor capsule during introduction.

A method of treatment using acid precursor capsules in accordance with the present invention includes the step of introducing an acid precursor capsule suspension into a well bore such that the acid precursor capsules contact water at an elevated temperature. The acid precursor capsule suspension includes the acid precursor capsules and a suspension fluid. Each acid precursor capsule includes an acid precursor that is a non-aqueous ester encapsulated in a polymerized shell. The well bore is defined by a well bore wall and traverses a hydrocarbon-bearing formation. The hydrocarbon-bearing formation comprises a face, a shallow portion and a deep portion. The face is a portion of the well bore wall associated with and operable to provide fluid communication between the hydrocarbon-bearing formation and the well bore.

In accordance with some embodiments of the present invention, a method of treatment using the acid precursor capsule includes introducing the acid precursor capsule delivery system into a well bore such that the acid precursor capsule contacts the water at the elevated temperature. The well bore is defined by a well bore wall and traverses a hydrocarbon-bearing formation. The hydrocarbon-bearing formation comprises a face, a shallow portion and a deep portion. The face is a portion of the well bore wall associated with and operable to provide fluid communication between the hydrocarbon-bearing formation and the well bore.

The slow release of non-aqueous ester acid precursors by micrometer- or nanometer-sized capsules and the delayed formation of associated acids by the non-aqueous ester acid precursors in accordance with the present invention can improve hydrocarbon recovery, water shut-off operations, filter cake removal and matrix acidification (deeper wormhole creation) processes.

In some embodiments, the mean diameter of the capsules of the acid precursor can be as small as 50 nanometers. Such small diameter capsules before the end of the dissolution period and while in the introduced suspension, formation water or brine, at elevated temperatures can be introduced into the shallow portion (the close-in portion of the hydrocarbon-bearing formation relative to the well bore) of the hydrocarbon-bearing formation through large pores, natural fissures or propped open fracking cracks to extend treatment and acidification into the shallow portion of the hydrocarbon-bearing formation.

In an embodiment of the method, the depth of the shallow portion of the hydrocarbon-bearing formation from the well bore wall of the well bore is in a range of from about one (1) well bore diameter to about five (5) well bore diameters. In another embodiment of the method, the depth of the shallow portion of the hydrocarbon-bearing formation from the well bore wall of the well bore is the furthest depth that the acid precursor capsules can migrate while the polymerized shell remains intact.

Upon its release from the disintegrating polymerized shell, the non-aqueous ester acid precursor can be further introduced into a deep portion of the hydrocarbon-bearing formation before the hydrolysis period ends and the associated acid forms. The deep portion of the hydrocarbon-bearing formation is beyond the shallow portion of the hydrocarbon-bearing formation relative to the well bore. This allows a user to advantageously design and designate the depth of associated acid treatment between the filter cake of the well bore and the deep portion of the hydrocarbon-bearing formation with a single acid precursor capsule system. The user can perform multiple treatments using the same system. A "naked" acid formulation or even a commercial acid precursor does not give this much treatment flexibility or versatility.

BRIEF DESCRIPTION OF THE DRAWINGS

These and other features, aspects, and advantages of the present invention are better understood with regard to the following Detailed Description of the Preferred Embodiments, appended Claims, and accompanying Figures, where:

FIGS. 1A-E show embodiments of the method of use with embodiments of an acid precursor capsule. FIGS. 1A-E and their descriptions facilitate a better understanding of the acid precursor capsule, its method of use, and intermediary components and residual products. In no way should FIGS. 1A-E limit or define the scope of the invention. FIGS. 1A-E are simple diagrams for ease of description.

DETAILED DESCRIPTION OF THE PREFERRED EMBODIMENTS

The Specification, which includes the Summary of Invention, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a", "an" and "the" include plural references unless the context clearly indicates otherwise. The verb "comprises" and its conjugated forms should be interpreted as referring to elements, components or steps in a non-exclusive manner, and the invention illustrative disclosed suitably may be practiced in the absence of any element which is not specifically disclosed, including as "consisting essentially of" and "consisting of". The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur. "Operable" and its various forms means fit for its proper functioning and able to be used for its intended use. "Associated" and its various forms means something connected with something else because they occur together or that one produces the other.

"Soluble" means that a solute dissolves within a solvent forming a solution having a concentration of the solute of about 0.1 Molar (moles per Liter or M) or greater at room temperature (25° C.). "Slightly soluble" means that a solute dissolves within a solvent forming a solution having a concentration of the solute in a range of from about 0.1 Molar (M) to about 0.001 Molar (M) at room temperature. "Sparingly soluble" means that a solute dissolves within a solvent forming a solution having a concentration of the solute less than about 0.001 Molar at room temperature (25° C.). Solubility using these concentration ranges of solute in the solution may be determined at non-room temperature values. For example, a solute that is sparingly soluble at room temperature of the solvent may be determined to be slightly soluble or soluble at an elevated temperature of the solvent.

Spatial terms describe the relative position(s) of an object or a group of objects relative to another object or group of objects. The spatial relationships apply along vertical and horizontal axes. Orientation and relational words, including "uphole" and "downhole", are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The invention encompasses and bounds smaller ranges of the interval subject to any specific exclusion provided.

Where the Specification and appended Claims reference a method comprising two or more defined steps, the defined steps can be carried out in any order or simultaneously except where the context excludes that possibility.

FIG. 1

FIGS. 1A-E show embodiments of the method for treating a hydrocarbon-bearing formation with an embodiment of an acid precursor capsule.

Figure 1A:
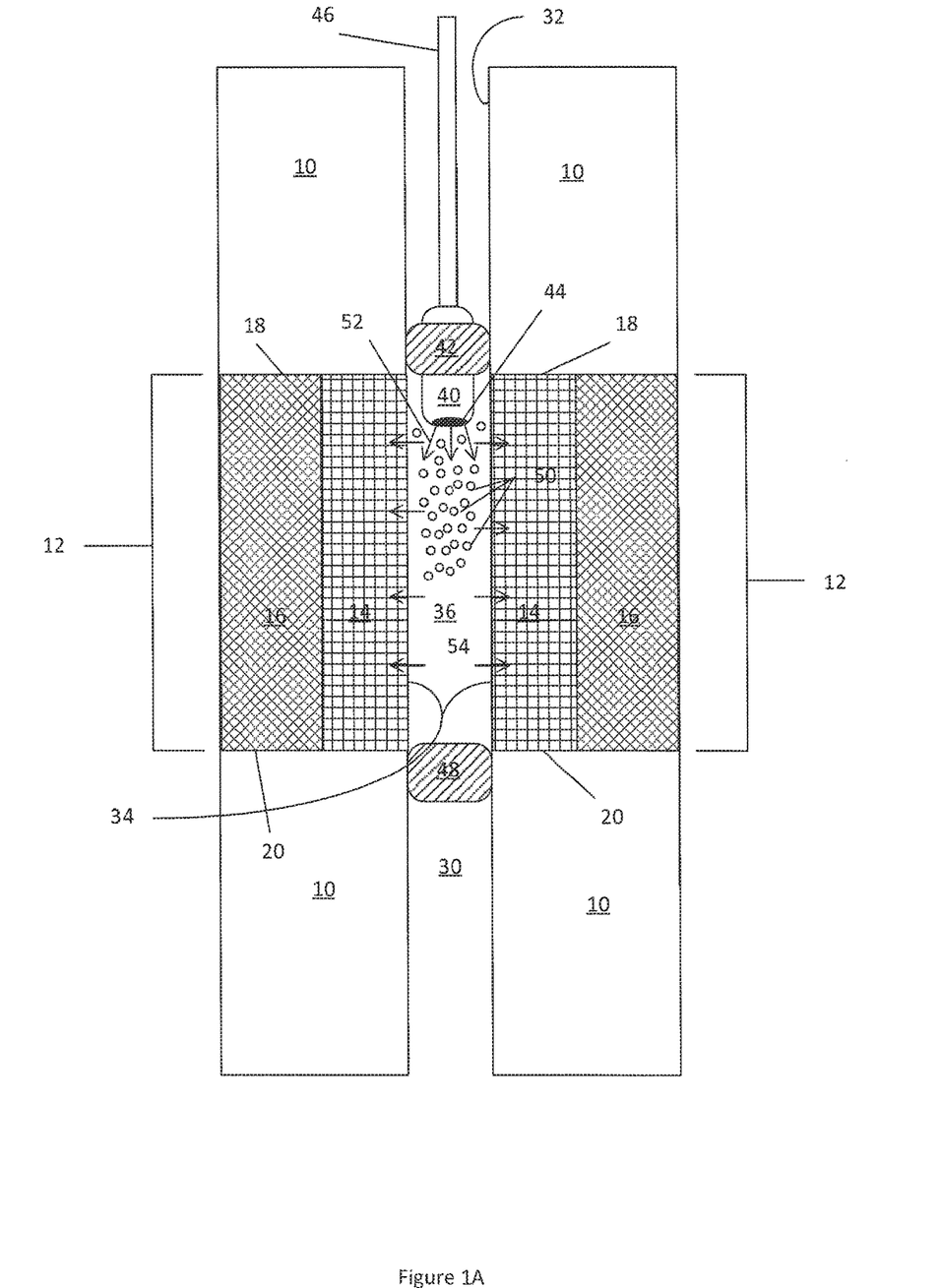
FIGS. 1A-E show embodiments of the method for treating a hydrocarbon-bearing formation with embodiments of an acid precursor capsule.

FIG. 1A shows an underground formation 10 including a hydrocarbon-bearing formation 12. A hydrocarbon-bearing formation 12 includes a shallow portion 14 of a hydrocarbon-bearing formation 12 and a deep portion 16 of the hydrocarbon-bearing formation 12. The hydrocarbon-bearing formation 12 has an upper bound 18 and a lower bound 20.

The underground formation 10 has a well bore 30 traversing through the underground formation 10, where a well bore 30 is defined by a well bore wall 32. The portion of the well bore wall 32 contacting both the hydrocarbon-bearing formation 12 and the well bore 30 is a formation face 34. The hydrocarbon-bearing formation 12 and the well bore 30 are in fluid communication with one another through the formation face 34.

An application tool 40 is located proximal to the upper bound 18 in the well bore 30 and includes a packer 42, which seals the well bore 30 fluidly uphole of the upper bound 18 from the portion of the well bore 30 downhole of the upper bound 18. The application tool 40 includes a nozzle 44 for introducing the acid precursor capsule into the well bore 30. A tubing 46 couples to the application tool 40 and a source for the acid precursor capsule on the surface. A previously installed packer 48 is located proximal to the lower bound 20 in the well bore 30 and acts to seal the portion of the well bore 30 fluidly uphole of the lower bound 20 from the portion of the well bore 30 downhole of the lower bound 20. The packer 42 and the previously installed packer 48 seal a portion of the well bore 30 between the upper bound 18 and the lower bound 20 from fluidly communicating with the remainder of the well bore 30, forming an isolated portion of the well bore 36.

The isolated portion of the well bore 36 includes a fluid that contains water at an elevated temperature. The native environment downhole or in a hydrocarbon-bearing formation imparts thermal energy such that the fluid present is at an elevated temperature ($\geq 150°$ F.) as compared to the ambient surface conditions (about 60° F.). The application tool 40 can introduce water in the form of artificial or natural brine, recycled formation water, seawater, brackish water, potable water or fresh water from a surface source. More likely, the water is present in the isolated portion of the well bore 36 as formation water or brine from the hydrocarbon-bearing formation 12 or a formation uphole or downhole from the hydrocarbon-bearing formation 12.

As represented in FIG. 1A, acid precursor capsules 50 (circles) are introduced (arrows 52) as part of an acid precursor capsule suspension through the nozzle 44 into the isolated portion of the well bore 36. As the acid precursor capsules 50 are introduced into the isolated portion of the well bore 36, the acid precursor capsules 50 contact the water at the elevated temperature in the isolated portion of the well bore 36. This initiates the dissolution period for the polymerized shells of the acid precursor capsules 50.

In addition to the initiation of the dissolution period, increasing fluid pressure in the isolated portion of the well bore 36 through the introduction of fluid drives fluid flow (arrows 54) from the isolated portion of the well bore 36 into the shallow portion 14 of the hydrocarbon-bearing formation 12.

Figure 1B:
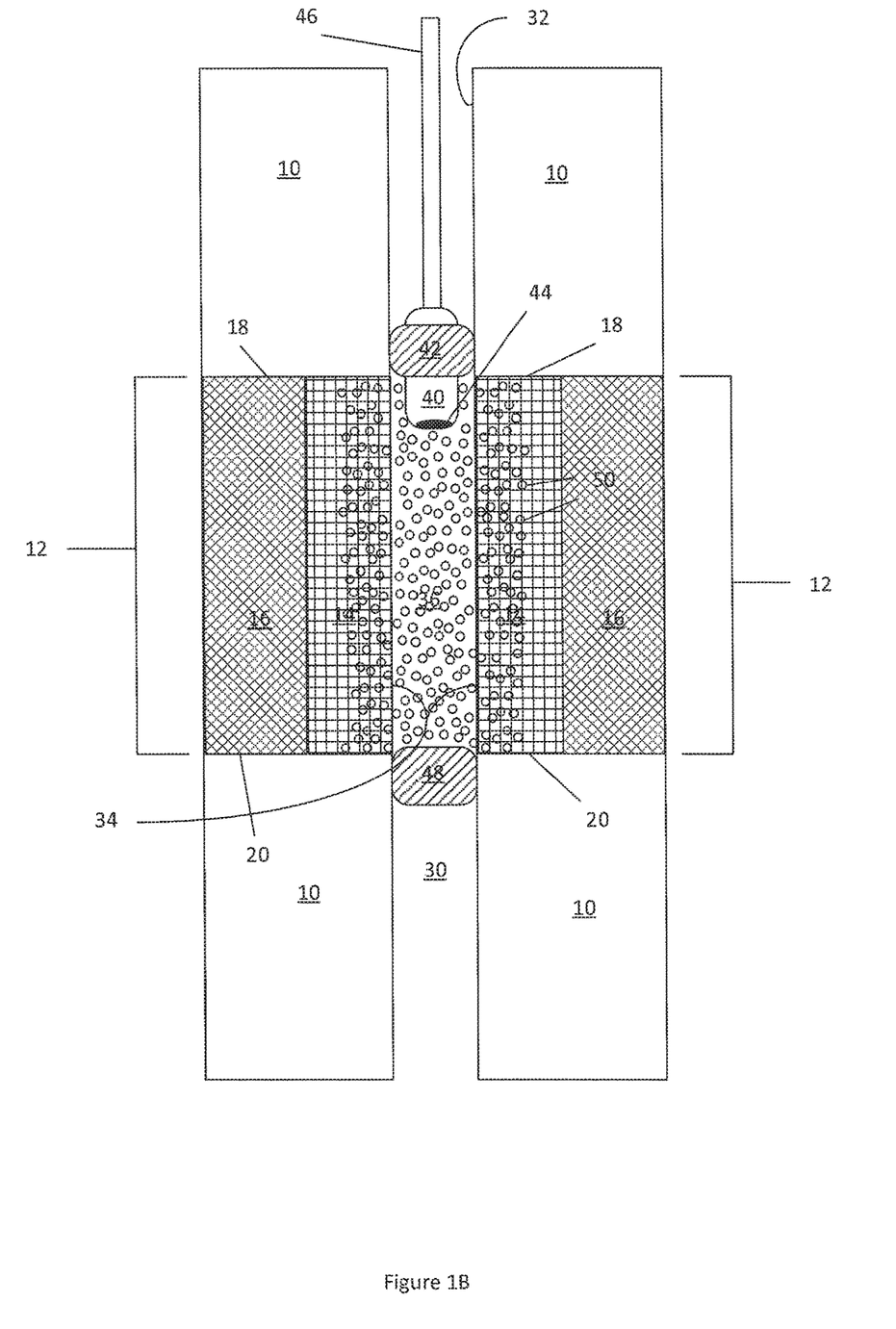

FIG. 1B shows the underground formation 10 after the introduction of the acid precursor capsules 50 into the isolated portion of the well bore 36. The acid precursor capsules 50 are shown being maintained in their location after the introduction into both the isolated portion of the well bore 36 and the shallow portion 14 of the hydrocarbon-bearing formation 12 during the dissolution period. The acid precursor capsules 50 migrate into the shallow portion 14 at a depth of one or more well bore diameters deep. The acid precursor capsules 50 do not contact the deep portion 16 while the polymerized shell is intact. The acid precursor capsules 50 are contacting water present in both the isolated portion of the well bore 36 and the shallow portion 14 of the hydrocarbon-bearing formation 12 and the polymerized shells are in a state of dissolution at the elevated temperature present in the hydrocarbon-bearing formation 12 and the well bore 30.

Figure 1C:
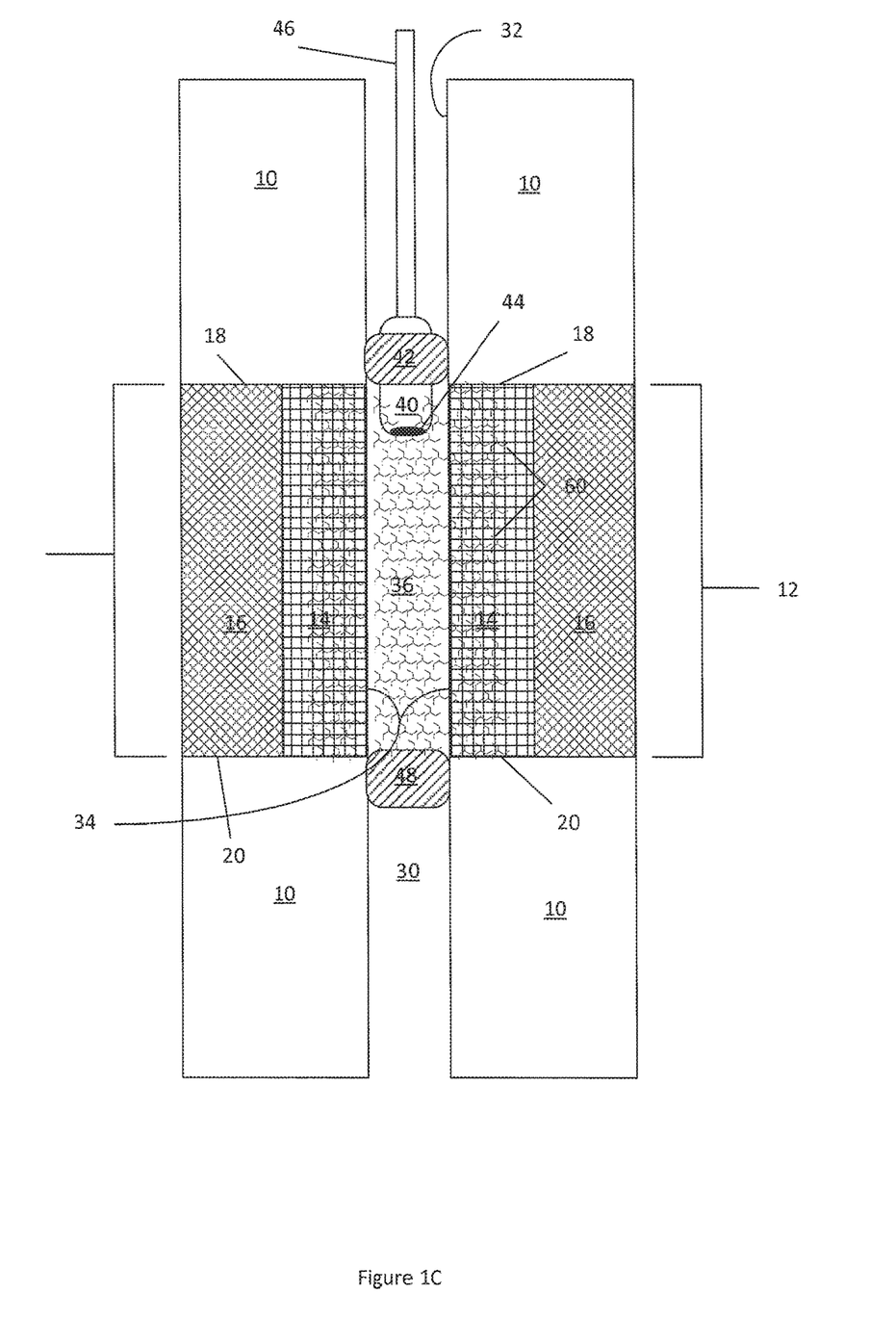

FIG. 1C shows the underground formation 10 after the completion of the dissolution period and into the hydrolysis period. The acid precursor capsules 50 of FIGS. 1A and 1B are not present in FIG. 1C as the polymerized shells have dissolved. An acid precursor 60 (triform) is present in both the isolated portion of the well bore 36 and the shallow portion 14 of the hydrocarbon-bearing formation 12 where the acid precursor capsules 50 were located. The hydrolysis period is where the associated acid begins to form in the dispersion, where the dispersion is water or another aqueous solution as the continuous phase and the non-aqueous droplets of the acid precursor 60 as the non-continuous phase.

Figure 1D:
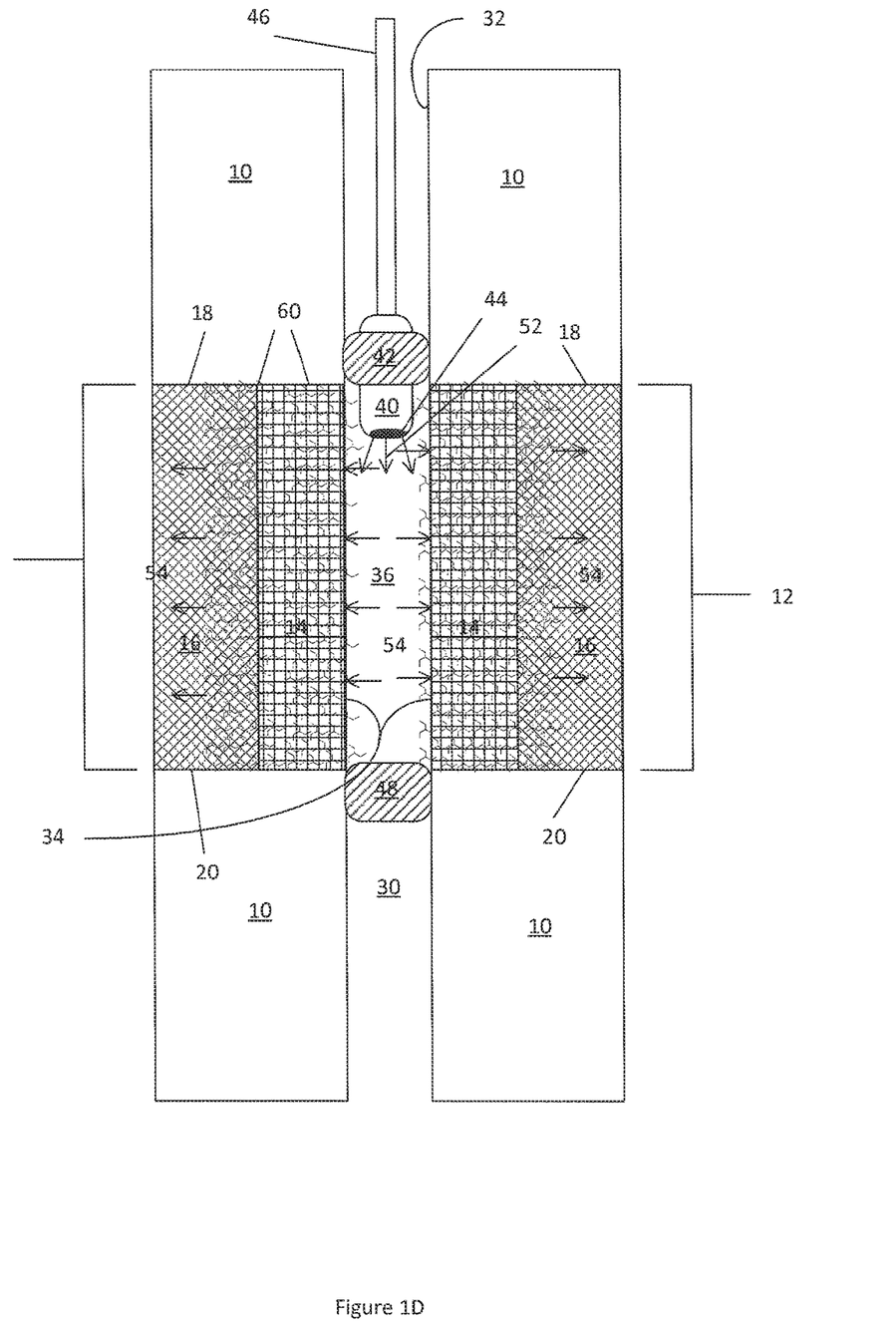

FIG. 1D shows the underground formation 10 during the introduction of the acid precursor 60 into the deep portion 16 of the hydrocarbon-bearing formation. The introduction occurs during the hydrolysis period of the acid precursor 60. The introduction (arrows 52) of a fluid through the nozzle 44 into the isolated portion of the well bore 36 drives the acid precursor 60 to flow (arrows 54) from isolated portion of the well bore 36 into the shallow portion 14 of the hydrocarbon-bearing formation 12 and from the shallow portion 14 to the deep portion 16 of the hydrocarbon-bearing formation 12.

Figure 1E:
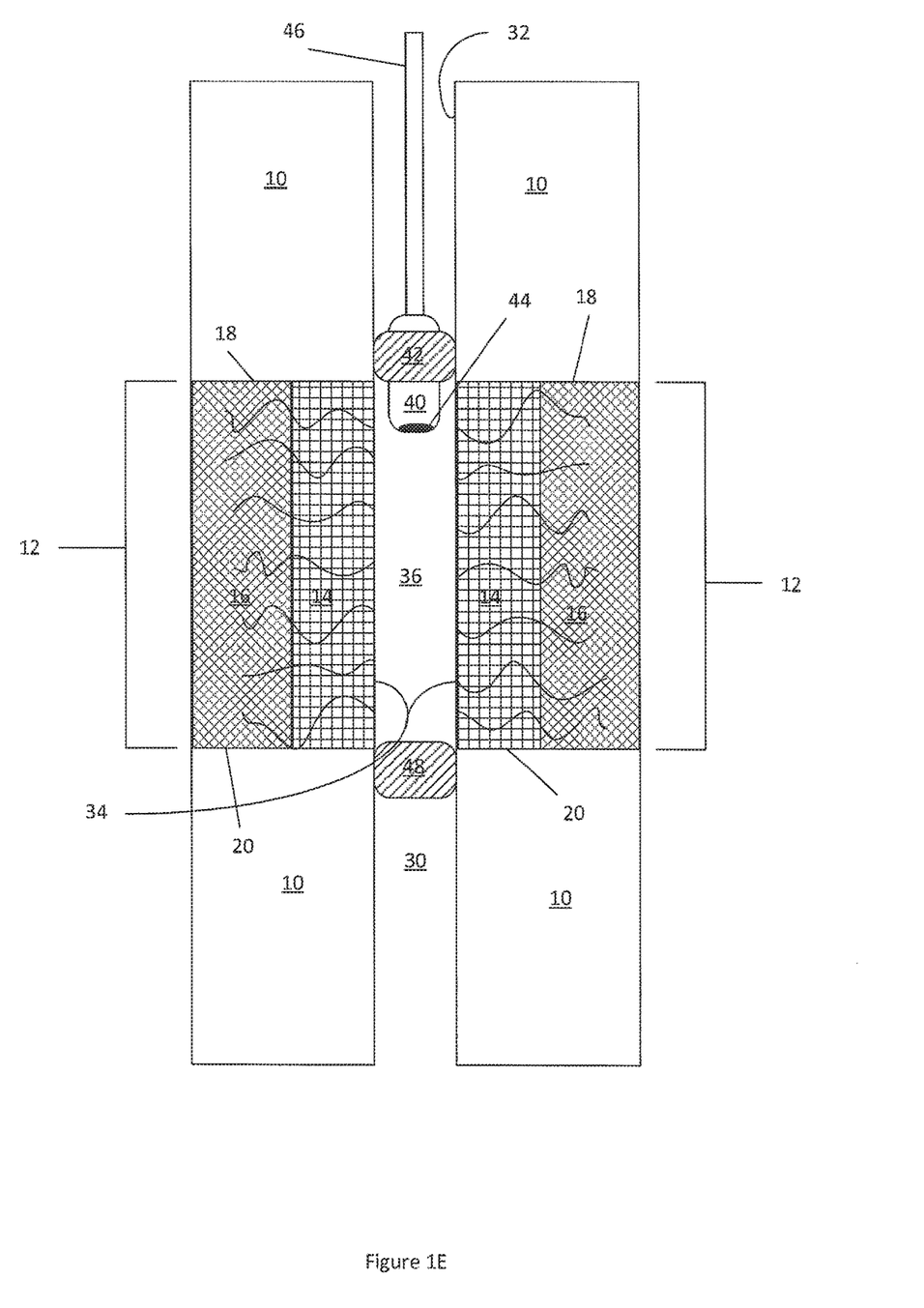

FIG. 1E shows the underground formation 10 after the hydrolysis period. The acid precursor 60 previously located in both the shallow portion 14 of the hydrocarbon-bearing formation 12 and the deep portion 16 of the hydrocarbon-bearing formation 12 as shown in FIG. 1D has converted into the associated acid, the aqueous acid solution formed, and the aqueous acid solution reacted with the hydrocarbon-bearing formation 12 to form fluid flow pathways 70 through the hydrocarbon-bearing formation 12. The fluid flow pathways 70 are operable to convey hydrocarbons produced from both the shallow portion 14 and the deep portion 16 of the hydrocarbon-bearing formation 12 into the isolated portion of well bore 36. The fluid flow pathways 70 are also operable to convey fluids, including treatment fluids, from the isolated portion of the well bore 36 into both the shallow portion 14 and the deep portion 16 of the hydrocarbon-bearing formation 12.

Acid Precursor and Associated Acid

The acid precursor is a non-aqueous ester compound that disassociates into an associated acid. The acid precursor hydrolyzes in the presence of water over a hydrolysis period at elevated temperatures into the associated acid. In an embodiment of the method, the hydrolysis period is in a range of from about 1 hour to about 2 weeks in water at temperatures in a range of from about 100° C. to about 120°

C. The associated acid is operable to react with the acid-reactive constituents of filter cake along the well bore wall and from the face of a hydrocarbon-bearing formation. This promotes the removal of the filter cake. The associated acid is also operable to react with the acid-reactive constituents of the hydrocarbon-bearing formation.

An example of a hydrolysis reaction of an acid precursor into its associated acid is shown in Equation 1:

$$CH_3COOCH_2CH_3(aq.) + H_2O(l) \longleftrightarrow CH_3COOH(aq.) + CH_3CH_2OH(aq.) \quad \text{(Equation 1)}.$$

The hydrolysis reaction (left to right) of ethyl ethanoate (the acid precursor; ethyl acetate) in the presence of water forms ethanoic acid (the associate acid; acetic acid) with ethanol (an alcohol).

Acid precursors include organic ester compounds having the general formula of Equation 2 that produce mono-carboxylic acids upon hydrolysis:

$$R_1\text{—COO—}R_2 \quad \text{(Equation 2)},$$

where $R_1$ is =H, phenyl, methoxy phenyl, alkyl phenyl, $C_{1-30}$ alkyl, $C_{1-30}$ substituted alkyl or a substituted phenyl; and $R_2$=phenyl, methoxy phenyl, alkyl phenyl, $C_{1-30}$ alkyl, $C_{1-30}$ substituted alkyl or a substituted phenyl group. Acid precursors include ethyl methanoate (ethyl formate), ethyl ethanoate (ethyl acetate), ethyl 2-hydroxyproanoate (ethyl lactate), propyl formate, butyl formate, amyl formate, anisyl formate, methyl acetate, propyl acetate, butyl propionate, isoamyl propionate, methyl butyrate, ethyl isobutyrate and butyl isobutyrate.

Acid precursors optionally include mono-, di- and tri-esters of glycerol, including glycerol monoacetate (monoacetin), glycerol diacetate (diacetin), glycerol triacetate (triacetin) and tripropionin.

Acid precursors optionally include organic esters compounds that disassociate into associated di- and tri-carboxylic acid compounds, including diethyl malonate, butyl ethyl malonate, dimethyl succinate, diethyl succinate, diethyl tartrate, dimethyl tartrate and triethyl citrate.

Acid precursors optionally include organic esters that form an associated acid selected from the group consisting of formic acid, acetic acid, propionic acid, lactic acid, butyric acid, isobutyric acid, malonic acid, succinic acid, malic acid, tartaric acid, citric acid and combinations thereof.

The hydrolysis reaction of the acid precursor in the aqueous solution over the hydrolysis period generates the aqueous acid solution in situ. The hydrolysis reaction does not occur with water at standard conditions unless the reaction is acid-promoted. The hydrolysis reaction of Equation 1 occurs more rapidly at elevated temperatures and when the acid precursor has fewer carbon atoms. The acid precursor is operable to convert during the hydrolysis period into the associated acid in the presence of water at the elevated temperature (≥150° F.). Even at the elevated temperatures, the acid precursor does not begin to convert into the associated acid until the polymerized shell releases the acid precursor and the acid precursor contacts the water in the aqueous solution.

Many of the known ester acid precursors are only slightly soluble or sparingly soluble in water even at the elevated temperatures found in the well bore environment. The reduced aqueous solubility for certain acid precursors limits the rate of conversion into the associated acid and the formation of the aqueous acid solution. The lack of solubility increases the allowable time for introducing and positioning the acid precursor before its conversion into the associated acid. Upon the disassociation of the polymerized shell, a dispersion forms that comprises a bead of slightly or sparingly soluble non-aqueous liquid acid precursor within the continuous aqueous solution.

The associated acid forms at the surface interface between the aqueous solution and the slightly or sparingly soluble acid precursor bead. Upon formation, the associated acid, which is solvent in the water phase, moves away from the interface between the non-aqueous liquid acid precursor bead and the continuous phase and into the forming associated acid solution.

At the end of the hydrolysis period, the formed aqueous acid solution has a pH that is acidic. In an embodiment of the method, the formed aqueous acid solution has a pH that is about or less than 4.0. In an embodiment of the method, the formed aqueous acid solution has a pH that is less than 3.0. In an embodiment of the method, the formed aqueous acid solution has a pH in a range of from about 2.0 to about 3.0.

Polymerized Shell

The polymerized shell encapsulates the acid precursor to prevent interaction between the acid precursor and the aqueous solution until the shell disassociates. The polymerized shell dissolves over a period of time in the presence of an aqueous solution at elevated temperatures. The dissolution period for a polymerized shell is dependent on the thickness of the shell and the elevated temperature, where an elevated temperature promotes a shorter dissolution period and a thicker shell wall promotes a longer dissolution period, the polymer used to form the shell and the degree of cross-linking.

Polymerized shells are formed through techniques including interfacial polymerization, in-situ polymerization and coacervation. The polymerized shell of the acid precursor capsule degrades over time, exposing the acid precursor to water, facilitating the hydrolysis to the associated acid.

The mean capsule diameter of the acid precursor capsule is as small as about 50 nanometers as measured from outside surface of the capsule to the opposing outside surface. In an embodiment, the mean capsule diameter of the acid precursor capsule is in a range of from about 50 nanometers to about 130 microns, or about 15 microns, or about 10 microns, or about 300 nanometers. In an embodiment, the mean capsule diameter of the acid precursor capsule is in a range of from about 10 microns to about 130 microns or about 15 microns. Carbonate reservoir pore diameters are in a range of from about $1 \times 10^{-1}$ micron to about 20 microns; therefore, the mean capsule diameters should be smaller than the reservoir pore diameters to permit penetration into the shallow portion of the hydrocarbon-bearing formation.

The mean thickness of the capsule polymerized shell is defined by the total volume amount of polymer in the polymerized shell, which can be derived from the total amount of monomer(s) used to form the polymerized shell, divided by the number of acid precursor capsules times $4\pi r^2$, where r is the mean capsule radius. The number of acid precursor capsules is related to the volume of acid precursor used divided by $4\pi r^3/3$.

In an embodiment of the method, the polymerized shell has a dissolution period in a range of from about 1 hour to about 2 weeks in water at a temperature in a range of from about 100° C. to about 120° C. Dissolution means the complete reduction of the polymerized shell material. A drop in the pH of the suspension containing the acid precursor capsules indicates the initiation of the dissolution period assuming one knows the hydrolyzation rate of the acid precursor is expedient at the conditions under which hydrolyzation is occurring. The pH value remaining fixed at a value over time indicates the conclusion of the dissolution period. This observation indicates that the polymerized shells have completely dissolved and released the acid precursor, and that the acid precursor has completely hydrolyzed.

Acid Precursor Capsule Delivery System

The acid precursor capsules are introduced into the well bore as part of a suspension to help fluidize the solid acid precursor capsules and to improve their mobility and distribution. In an embodiment of the method, the acid precursor capsules are mixed with an aqueous suspension fluid having a temperature less than the elevated temperature such that the acid precursor capsule delivery system forms. The temperature being less than the elevated temperature prevents the dissolution of the polymerized shell before or during introduction of the acid precursor capsules suspension into the well bore. Upon introduction, the heat present in the well bore and the hydrocarbon-bearing formation will warm the acid precursor capsules and the fluid surrounding them to the elevated temperature soon after introduction. At that point, the dissolution of the polymerized shell begins.

In an embodiment of method, the acid precursor capsules are mixed with a non-aqueous suspension fluid such that the acid precursor capsule delivery system forms. In an embodiment of the method, the non-aqueous suspension fluid is a non-aqueous hydrophilic fluid. The non-aqueous suspension fluid can be hydrophilic such that, upon introduction into the well bore or the hydrocarbon-bearing formation, water from sources such as formation water and brines can be attracted to the acid precursor capsules. In an embodiment of the method, the suspension fluid is an oil, including a hydrocarbon, such that the outer portion of the polymerized shell is coated externally in a hydrophobic material. A hydrophobic coating can protect the polymerized shell from water until it is dissolved or removed either physically or chemically, including the use of a mild detergent or surfactant in an aqueous solution. This may make transport of the acid precursor capsule suspension more reliable.

In an embodiment of method, the suspension fluid has a pH that is less than about 7.0. Using an acidic suspension fluid can remove material before capsule dissolution to ensure that the capsules are incorporated into the hydrocarbon-bearing formation. In an embodiment of method, the suspension fluid has a pH in a range of about 3.0, or from about 4.0 to about 5.0, or to from about 6.0 to about 7.0.

Use of Acid Precursor Capsules

Both the filter cake on the well bore wall and the hydrocarbon-bearing formation include acid-reactive constituents that are susceptible to acid degradation from the formed aqueous acid solution. Water-based filter cake usually contains carbonates and silicates from the drilling mud and the material in the well bore. In some filter cake formulations, the carbonates and silicates are polymers or modified organic-coated materials. Limestone formations are comprised predominantly of calcium carbonates.

The method includes introducing the acid precursor capsule delivery system comprising acid precursor capsules into the well bore. The acid precursor capsule contacts a form of water at an elevated temperature. The acid precursor capsule delivery system comprises acid precursor capsules and the suspension fluid. Each acid precursor capsule comprises the acid precursor, which includes a non-aqueous ester, encapsulated in the polymerized shell.

In an embodiment of the method, the acid precursor capsules are maintained in the well bore for a first period such that the aqueous acid solution comprising the associated acid forms in the well bore, where the aqueous acid solution contacts and the associated acid reacts with the filter cake, which removes the filter cake from the well bore wall and forms the remainder of the aqueous acid solution. Optionally, the first period is both the dissolution period of the polymerized shell and the hydrolysis period for the acid precursor.

In a further embodiment, the acid precursor capsule delivery system is introduced into the well bore and the acid precursor capsules are maintained in the well bore such that the acid precursor solution forms proximal to the face of the hydrocarbon-bearing formation. The aqueous acid solution contacts and removes a portion of the filter cake attached to the face of the hydrocarbon-bearing formation. Upon removal, fluid communication between the well bore and the hydrocarbon-bearing formation is established through the face.

Optionally, the remainder of the aqueous acid solution contains a residual amount of the associated acid. The aqueous acid solution after reacting with a filter cake or a hydrocarbon-bearing formation can retain a residual amount of associated acid that is useful for further reactions with acid-reactive components in fresh formation material. In such an embodiment, the method further comprises the step of introducing the remainder of the aqueous acid solution into the shallow portion of the hydrocarbon-bearing formation through the face of the hydrocarbon-bearing formation. The residual amount of the associated acid reacts with the acid-reactive components in the shallow portion of the hydrocarbon-bearing formation.

The interaction of the associated acid with the acid-reactive constituents in the filter cake occurs in such a manner that not all of the associated acid interacts with the acid-reactive constituents instantly. The associated acid reaction with the acid-reactive constituents in the filter cake may occur in a range of a few minutes to days depending on the dissolution and hydrolysis periods. Gradually, the associated acid chemically degrades the filter cake at the face of the hydrocarbon-bearing formation such that fluid communication can occur between the formation and the well bore through the face. The removal of at least a portion of the filter cake from the face of the hydrocarbon-bearing formation facilitates fluid communication. Additional treatments to or flow-back from the hydrocarbon-bearing formation can occur after clearing at least a portion of the filter cake from the face.

In an embodiment of the method, the acid precursor capsules are maintained in the well bore for a first period such that the dispersion comprising the acid precursor forms in the well bore. Optionally, the first period is equal to or greater than the dissolution period but less than the dissolution period and hydrolysis period combined. Optionally, the well bore dispersion includes water in the form of an aqueous solution, formation water or brine at the elevated temperature such that the hydrolysis period initiates upon dissolution of the polymerized shell. The well bore dispersion optionally contacts the face of the hydrocarbon-bearing formation. An embodiment of the method also includes where the dispersion is introduced into and maintained for a second period in the shallow portion of the hydrocarbon-bearing formation. Optionally, the second period is the hydrolysis period. The aqueous acid solution forms within the shallow portion of the hydrocarbon-bearing formation. Optionally, the hydrolysis period starts upon the dispersion contacting water located within the shallow portion of the hydrocarbon-bearing formation, forming an aqueous acid solution. The resulting aqueous acid solution with the associated acid contacts and reacts with the acid-reactive constituents of the shallow portion of the hydrocarbon-bearing formation, thereby forming the remainder of the aqueous acid solution.

Optionally, the remainder of the aqueous acid solution contains a residual amount of the associated acid. In a further embodiment, the method further comprises the step of introducing the remainder of the aqueous acid solution into the deep portion of the hydrocarbon-bearing formation such that the residual amount of the associated acid reacts with the acid-reactive constituents located in the deep portion of the hydrocarbon-bearing formation in the deep portion.

In an embodiment of the method, the acid precursor capsule delivery system is introduced into the well bore such that the acid precursor capsules are located within the shallow portion of the hydrocarbon-bearing formation. In the embodiment of the method, the acid precursor capsules are maintained for the first period such that a dispersion of acid precursor and aqueous solution forms within the shallow portion of the hydrocarbon-bearing formation. Optionally, the first period is equal to or greater than the dissolution period but less than the dissolution period and the hydrolysis period combined. In a further embodiment of the method, the dispersion is maintained in the shallow portion of the hydrocarbon-bearing formation for a second period such that the aqueous acid solution forms in the shallow portion. Optionally, the second period is equal to or greater than the hydrolysis period of the acid precursor. The formed aqueous acid solution contacts the hydrocarbon-bearing formation and the associated acid reacts with the acid-reactive constituents of the hydrocarbon-bearing formation in the shallow portion, forming a residual aqueous acid solution in the shallow portion. In a further embodiment, the residual aqueous acid solution contains a portion of associated acid, alternatively referred to as remainder associated acid, and the method further comprises the step of introducing the residual aqueous acid solution into the deep portion of the hydrocarbon-bearing formation, the remainder associated acid reacting with the hydrocarbon-bearing formation in the deep portion of the formation.

In a further embodiment of the method where the acid precursor capsule delivery system is introduced into the well bore such that the acid precursor capsules are located within the shallow portion of the hydrocarbon-bearing formation and the dispersion forms within the shallow portion, the method further comprises the step of introducing the dispersion into the deep portion of the hydrocarbon-bearing formation. An embodiment of the method further comprises maintaining the dispersion for a second period such that the aqueous acid solution forms within, contacts and reacts with the acid-reactive constituents of the deep portion of the hydrocarbon-bearing formation. Optionally, the second period is equal to or less than the hydrolysis period as the traversal through the formation improves mixing and disrupts the boundaries between the non-aqueous acid precursor and water present in the formation. The formed aqueous acid solution contacts the hydrocarbon-bearing formation and the associated acid reacts with the acid-reactive components hydrocarbon-bearing formation in the deep portion.

Although many of the embodiments of the method describe maintaining the acid precursor capsule for the dissolution period and maintaining the dispersion for the hydrolysis period, the maintaining steps may be performed for periods shorter or longer than the dissolution period, the hydrolysis period and the length of the periods combined. Optionally, the acid precursor capsule can be maintained in the well bore for a first period that is greater than the dissolution period but less than the dissolution period and the hydrolysis period combined. For such a method, at least part of the acid precursor hydrolyzes into the associated acid but some remains in the form of the acid precursor dispersion. Optionally, the acid precursor capsule can be maintained in the well bore for a first period that is less than the dissolution period before introduction into the shallow portion of the formation and optionally the deep portion of the formation during a second period. For such a method, the polymerized shell of the acid precursor capsule is thinned in the well bore before introduction into the shallow portion of the hydrocarbon-bearing formation. The introduction of the acid precursor capsule with thinned polymerized shells can allow some of the introduced capsules to rupture upon contacting the shallow portion of the hydrocarbon-bearing formation. The rupturing capsules would introduce some of the acid precursor into the shallow portion of the hydrocarbon-bearing formation before the completion of the dissolution period, thereby initiating a hydrolysis period for the prematurely formed aqueous dispersion. Such methods of treating the hydrocarbon-bearing formation can eliminate microparticles from the shallow portion of the hydrocarbon-bearing formation while pushing a portion of the associated acid deeper into the formation. Such flexibility in the administration of the acid precursor capsule suspension, the acid precursor dispersion and the aqueous acid solution in maintaining and introducing into the well bore, the shallow portion and the deep portion of the hydrocarbon-bearing formation for periods (a first period and a second period) that are not associated strictly with either the dissolution period or the hydrolysis period permits advantageously allows for the determination of the optimal treatment method(s) for the well bore and the hydrocarbon-bearing formation.

Example

Examples of specific embodiments facilitate a better understanding of making and using the encapsulated acid precursors. In no way should the Examples limit or define the scope of the invention.

Comparative Example

A solution containing 17.2 wt. % (0.17 Molar) triacetin in water is maintained at 100° C. for 24 hours. The pH of the solution decreases as the acid precursor triacetin hydrolyzes in the aqueous dispersion and forms the aqueous acid solution forms with the associated acetic acid. The pH of the aqueous acid solution as a function of time, which is based upon the hydrolysis rate of triacetin, is shown in Table 1. Triacetin is known to have a hydrolysis rate constant of $7.04 \times 10^{-5}$ $s^{-1}$ at 100° C. The half-life at that hydrolysis rate is 9,840 seconds (about 2.7 hours).

TABLE 1

Time versus Triacetin and Acetic Acid molar concentration (M) and pH of the aqueous acid solution.

| Time(hours) | Triacetin(M) | Acetic Acid (M) | pH |
|---|---|---|---|
| 0 | 0.1700 | 0.0000 | 7.00 |
| 6 | 0.0377 | 0.3969 | 2.58 |
| 12 | 0.0084 | 0.4849 | 2.53 |
| 18 | 0.0019 | 0.5044 | 2.53 |
| 24 | 0.0004 | 0.5088 | 2.52 |

The comparative example shows that acetic acid is formed in a relatively short (hydrolysis) period in the aqueous solution at the elevated temperature without any encapsulation.

Example 1

A reactor containing 9.16 grams (g) of gelatin, 22 g of ammonium sulfate, 50 g of triacetin and 236 g of water is vigorously mixed at about 50° C. and a pH of about 4.3 for 30 minutes. The gelatin is sourced from animal bone. After 30 minutes of mixing, the reactor is permitted to cool slowly overnight to ambient conditions. The gelatin dissolves in the water during mixing. With the addition of ammonium sulfate, the gelatin precipitates around the triacetin droplets (present as a non-aqueous solvent phase in the water solution) and forms a gelatin coating. After cooling, 5 g of 25 wt. % glutaraldehyde in 5 g of a 20 wt. % ammonium sulfate solution is added to the mixed contents within the reactor and permitted to react overnight. The addition of glutaraldehyde cross-links with the gelatin and forms the polymerized shell around the acid precursor. After about 24 hours, the resulting acid precursor capsule suspension is analyzed.

The resulting acid precursor capsule suspension is determined to have acid precursor capsules with a mean capsule diameter in a range of from about 10 microns to about 130 microns. The diameter of the capsules is measured visually using either optical microscopy or scanning electron microscope (SEM).

The acid precursor capsule suspension, where each capsule contains a 17.2 wt. % (0.79 M) acid precursor composition of triacetin in water, is introduced into a 100° C. reactor. The pH of the suspension of capsules, the formed dispersion resulting from the dissolution of the polymerized shell of the acid precursor capsules and the final aqueous acid solution as a function of time, which is based upon both the dissolution of the polymerized shell and the hydrolyzation of the triacetin, is shown in Table 2.

TABLE 2

Time versus pH of the capsule suspension and the formed aqueous acid solution.

| Time(hours) | pH |
|---|---|
| 0 | 4.2 |
| 24 | 3.5 |
| 48 | 3.2 |
| 72 | 2.5 |

Experiment 1 shows that versus the Comparative Example, where the hydrolysis reaction from triacetin to acetic acid started upon contact with water, the actual conversion rate of triacetin to acetic acid is reduced from the known hydrolysis rate once a polymerized shell encapsulates the ester acid precursor using the coacervation encapsulation technique.

Example 2

80 grams of triacetin solution, which includes 14.9 g of isophorone diisocyanate (CAS 4098-71-9 from Aldrich), is added to a 250 mL (milliliter) aqueous solution containing 5 g of 88 mole % hydrolyzed poly(vinyl alcohol) (PVA) (CAS 9002-89-5; Aldrich; molecular weight average in a range of from about 30,000 to about 70,000 g/mole) in a reactor. The PVA assists in dispersing the triacetin in the water solution. The combination is mixed vigorously. After vigorous mixing of the two solutions, 5 mL of 50 wt. % triethylene tetraamine (TETA) in water is added and stirred into the mixture. The temperature of the reactor is raised to 55° C. and is maintained while stirring continues for about 3 hours. The diisocyanate and the TETA react to form the polymerized shell around the triacetin.

The resulting acid precursor capsule suspension is determined to have acid precursor capsules with a mean capsule diameter in a range of from about 50 nm (nanometers) to about 300 nm and contains the acid precursor triacetin. Experiment 2 shows the formation of polymerized capsule and nanometer sized acid precursor capsules can be prepared by using the interfacial polymerization technique.

Example 3

14 grams of urea, 3 g of resorcinol and 0.2 g of ammonium chloride are added to 300 mL of an aqueous solution. Ammonium chloride acts as a buffer and stabilizes the pH of the solution. The aqueous solution already contains 3.33 wt. % of a hydrolyzed poly(ethylene-alt-maleic anhydride) copolymer. The ingredients are stirred vigorously, while 80 grams of triacetin is added to the mixture with continued stirring. The reactor temperature is raised and maintained at 55° C. while stirring. 25 milliliters of 37 wt. % formaldehyde is added and allowed to react with the aqueous solution for about five (5) hours while stirring. The urea, resorcinol and formaldehyde react to form the polymerized shell around the triacetin.

The resulting acid precursor capsule suspension is determined to have acid precursor capsules with a mean capsule diameter in a range of from about 10 microns to about 15 microns. Experiment 3 shows that the acid precursor capsules can be prepared by the in-situ polymerization technique.

Experiment 4

80 grams of a triacetin solution containing 10 g of isophorone diisocyanate (CAS 4098-71-9 from Aldrich) is added to a 250 mL aqueous solution containing 5 g of 88 mole % hydrolyzed PVA (CAS 9002-89-5; Aldrich; molecular weight average in a range of from about 30,000 to 70,000 g/mole) in a reactor. The mixture is stirred vigorously. 1 mL of 50 wt. % TETA in 10 g of water is added during stirring. The temperature is raised to 55° C. and the mixture is stirred at that temperature for about three (3) hours. The diisocyanate and the TETA react to form the polymerized shell around the triacetin.

The resulting acid precursor capsule suspension is determined to have acid precursor capsules with a mean capsule diameter in a range of from about 50 nm to about 300 nm and contains the acid precursor triacetin. Experiment 4 shows that nanometer sized acid precursor capsules can be prepared by using the interfacial polymerization technique with a lesser amount of diisocyanate than Experiment 2.

A visual comparison of the acid precursor capsule of Experiment 2 with that of Experiment 4 using microscope images indicates that that there are greater numbers of relatively larger mean capsule diameter acid precursor capsules associated with Experiment 2. Although not wanting to be limited by theory, this may indicate a thicker coating for the acid precursor capsules of Experiment 2 given that more diisocyanate was used in forming their polymerized shells. A thicker coating would extend the dissolution period for the acid precursor capsules of Experiment 2 versus the dissolution period of Experiment 4 based upon use in similar operating conditions.

What is claimed is:

1. A method of treatment using an acid precursor capsule comprising the steps of:
    introducing an acid precursor capsule delivery system into a well bore such that the acid precursor capsule contacts water at an elevated temperature,
        where the acid precursor capsule delivery system comprises the acid precursor capsule and a suspension fluid,
        where an acid precursor capsule comprises an non-aqueous ester acid precursor that is operable to convert into an associated acid during a hydrolysis period, such that the hydrolysis period is where the associated acid begins to form, while in contact with water at an elevated temperature and that is encapsulated in a polymerized shell such that the polymerized shell contains the non-aqueous ester acid precursor and prevents interaction between the non-aqueous ester acid precursor and the water, where the polymerized shell is operable to dissolve during a dissolution period while in contact with the water at the elevated temperature,
        where the well bore is defined by a well bore wall and traverses a hydrocarbon-bearing formation,
        where the hydrocarbon-bearing formation comprises a face, a shallow portion and a deep portion, and
        where the face is a portion of the well bore wall through which the hydrocarbon-bearing formation and the well bore are in fluid communication.

2. The method of claim 1, further comprising the step of:
    mixing the acid precursor capsule with an aqueous suspension fluid having a temperature that is less than the elevated temperature such that the acid precursor capsule delivery system forms.

3. The method of claim 1, further comprising the step of:
    mixing the acid precursor capsule with a non-aqueous hydrophilic fluid such that the acid precursor capsule delivery system forms.

4. The method of claim 1, further comprising the step of:
    maintaining the acid precursor capsule in the well bore for a first period such that the aqueous acid solution comprising an associated acid forms from the dissolution of the acid precursor capsule and the hydrolysis of the non-aqueous acid precursor in the well bore,
        where the aqueous acid solution contacts a filter cake attached to the well bore wall and the associated acid reacts with the acid-reactive component of the filter cake and where the reaction of the acid-reactive component and the associated acid removes the filter cake from the well bore wall and forms the remainder of the aqueous acid solution.

5. The method of claim 4, where a portion of the filter cake attached to the well bore wall is attached to the face of the hydrocarbon-bearing formation and where the associated acid reaction removes the portion of the filter cake attached to the face such that fluid communication between the well bore and the hydrocarbon-bearing formation is established through the face.

6. The method of claim 4, further comprising the step of:
    introducing the remainder of the aqueous acid solution into the shallow portion of the hydrocarbon-bearing formation through the face such that a residual amount of the associated acid reacts with the acid-reactive components in the shallow portion,
    where the remainder of the aqueous acid solution comprises the residual of the associated acid.

7. The method of claim 1, further comprising the step of:
    maintaining the acid precursor capsule in the well bore for a first period such that a dispersion comprising the non-aqueous ester acid precursor forms in the well bore.

8. The method of claim 7, further comprising the steps of:
    introducing the dispersion into the shallow portion of the hydrocarbon-bearing formation; and
    maintaining the dispersion for a second period such that an aqueous acid solution comprising an associated acid forms within, contacts and reacts with the acid-reactive constituents in the shallow portion of the hydrocarbon-bearing formation, forming the remainder of the aqueous acid solution.

9. The method of claim 8, further comprising the step of:
    introducing the remainder of the aqueous acid solution into the deep portion of the hydrocarbon-bearing formation such that a residual amount of the associated acid reacts with the acid-reactive components in the deep portion,
    where the remainder of the aqueous acid solution comprises the residual amount of the associated acid.

10. The method of claim 1, where the acid precursor capsule delivery system is introduced into the well bore such that the acid precursor capsule is located within the shallow portion of the hydrocarbon-bearing formation.

11. The method of claim 10, further comprising the step of:
    maintaining the acid precursor capsule in the shallow portion of the hydrocarbon-bearing formation for a first period such that a dispersion comprising the non-aqueous ester acid precursor forms in the shallow portion.

12. The method of claim 11, further comprising the step of:
    maintaining the dispersion for a second period such that the aqueous acid solution forms within, contacts and reacts with an acid-reactive constituent of the shallow portion of the hydrocarbon-bearing formation, forming the remainder of the aqueous acid solution.

13. The method of claim 12, further comprising the step of:
    introducing the remainder of the aqueous acid solution into the deep portion of the hydrocarbon-bearing formation such that a residual amount of the associated acid reacts with the acid-reactive component in the deep portion,
        where the remainder of the aqueous acid solution comprises the residual amount of the associated acid.

* * * * *